(No Model.)
R. J. SCHNEIDER.
RAKE.
No. 494,897. Patented Apr. 4, 1893.
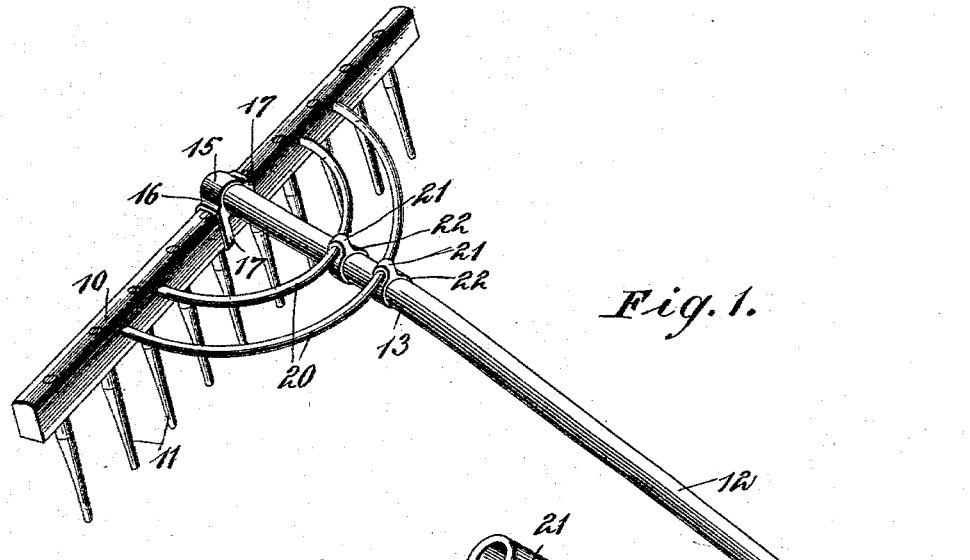
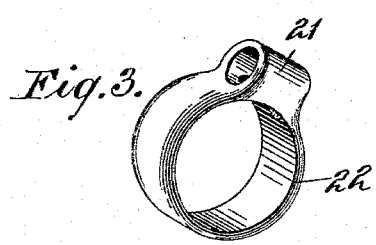
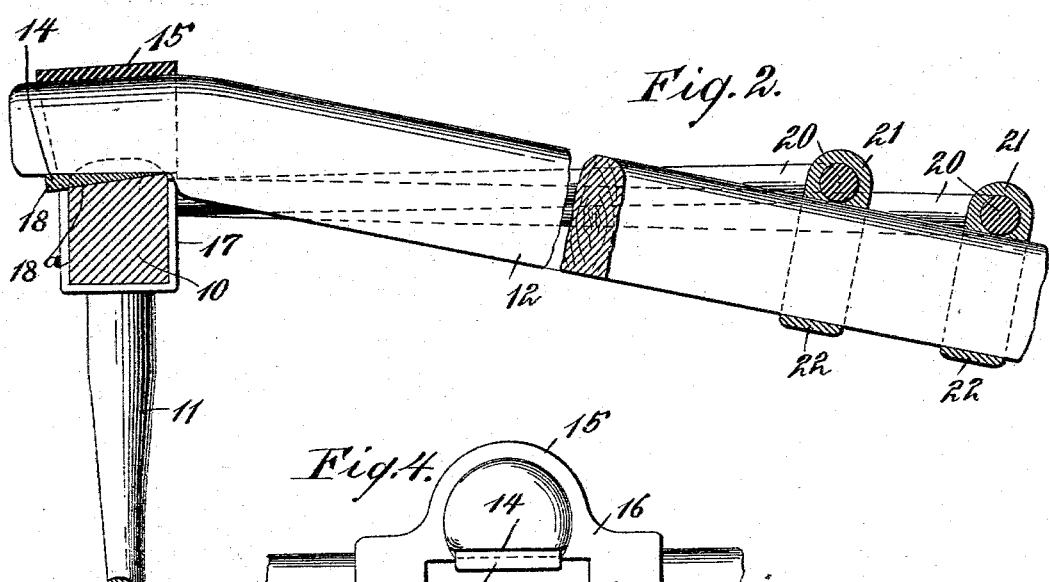
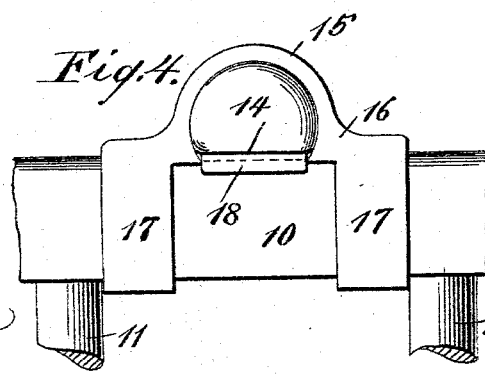
WITNESSES:
John A. Rennie
C. Sedgwick
INVENTOR
R. J. Schneider
BY
Munn & Co.
ATTORNEYS.

UNITED STATES PATENT OFFICE.

ROBERT J. SCHNEIDER, OF NEW YORK, N. Y.

RAKE.

SPECIFICATION forming part of Letters Patent No. 494,897, dated April 4, 1893.

Application filed October 25, 1892. Serial No. 449,938. (No model.)

*To all whom it may concern:*

Be it known that I, ROBERT J. SCHNEIDER, of New York city, in the county and State of New York, have invented a new and Improved Rake, of which the following is a full, clear, and exact description.

My invention relates to improvements in rakes, and especially to wooden rakes such as are used in raking hay and other light material. As these rakes are generally constructed, the tail or handle is inserted in a hole in the head and the braces extend through holes in the handle. This construction weakens both the head and handle at the points where the perforations occur; and the object of my invention is to obviate this difficulty and produce a rake which is very strong and not materially heavier than the ordinary rake.

A further object of my invention is to increase the holding capacity of this class of rakes, and construct the rake so that its several parts may be easily put together when the rake is made.

To these ends my invention consists in a rake, the construction of which will be hereinafter described and claimed.

Reference is to be had to the accompanying drawings forming a part of this specification, in which similar figures of reference indicate corresponding parts in all the views.

Figure 1 is a broken perspective view of a rake, showing my improvements. Fig. 2 is a broken enlarged longitudinal section through the main clip which fastens the head and handle together, and the clasps which secure the braces to the handle. Fig. 3 is a detail perspective view of one of the brace fastening clasps; and Fig. 4 is a broken end view of the rake, showing in detail the manner in which the main clip is secured to the rake head and handle.

The rake has the usual transverse head 10 in which the teeth 11 are inserted and fastened in the usual way, and the rake has also the long tail or handle 12 which is similar to the usual handle, except that it is bent upward, as shown at 13, to increase the holding capacity of the rake and it is fastened to the head in a novel manner. One end of the rake handle is reduced and flattened on the under side, as shown at 14, and this end of the handle enters a keeper 15 on the clip 16, which clip is secured to the head by means of the bands 17, and the latter clasp the head 10 closely and are placed so as to fit snugly between the two teeth 11 near the center of the head 10, as shown best in Fig. 4. This arrangement prevents the clip 16 from slipping on the head. When the rake is made the clip is attached before the teeth are inserted, although it will be seen that the bands 17 may be made malleable and folded around the head if desired. The outer end of the keeper 15 is preferably made slightly larger than the inner end; that is, of a slightly greater diameter, so as to permit the end of the rake handle to be split by a wedge if desired and held in place. It is not necessary usually to split the head, as the wedge 18 will hold the handle in place and will spread the end of the handle somewhat so as to prevent its withdrawal. The head 10 is notched and beveled slightly, as shown at 18$^a$ in Fig. 2, at a point immediately beneath the flattened and reduced end portion 14 of the rake handle, and the wedge 18 is driven between this bevel portion and the handle, as shown in Fig. 2, and when the wedge is driven home it securely locks the handle in place.

The rake is provided with the usual bent braces 20, which, instead of being extended through the rake handle in the usual way, are held in keepers 21 which are formed on the top sides of the ring clasps 22, and the latter are adapted to fit snugly on the handle 12. It will be seen then that the handle is fastened to the head of the rake in such a way that neither the head or handle are perforated, and consequently the rake is very strong. It will also be noticed that the rake may be easily put together, and that owing to the upward bend in the handle, its holding capacity is very large.

Having thus described my invention, I claim as new and desire to secure by Letters Patent—

1. In a rake, the combination of the rake head having the usual teeth and a beveled or inclined notch in the top, the clip clasped to the head and having a keeper adapted to extend over the beveled or inclined notch, a handle having a flattened end portion to enter the keeper, and a fastening wedge to fit between the handle and the beveled surface of the head, substantially as described.

2. The combination of the rake head having the usual teeth, the handle fastened to the head, the braces secured to the head and extending opposite the handle, and the rings secured to the handle and having keepers formed thereon to receive the braces, substantially as described.

3. As an improved article of manufacture, a rake comprising the usual head having the bent braces thereon, a clip shaped to fit the head and having a keeper upon it, a handle adapted to enter the head keeper, and ring clasps shaped to fit the handle and having keepers to receive the braces, substantially as described.

ROBERT J. SCHNEIDER.

Witnesses:
CHAS. F. BAUERDORF,
CHARLES ROHE.